(12) United States Patent
Courel et al.

(10) Patent No.: US 6,302,984 B1
(45) Date of Patent: *Oct. 16, 2001

(54) PROCESS AND DEVICE FOR TREATING VULCANIZED RUBBER SURFACES BEFORE BONDING

(75) Inventors: Jean-Marie Courel, Maringues; Denis Schruoffeneger, Chatel-Guyon; Serge Solignac, Ceyrat, all of (FR)

(73) Assignee: Copangnie Generale des Etablissements Michelin - Michelin & Cie, Clermont - Ferrand (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/944,568

(22) Filed: Oct. 6, 1997

Related U.S. Application Data

(62) Division of application No. 08/359,525, filed on Dec. 20, 1994, now Pat. No. 5,759,322.

(30) Foreign Application Priority Data

Dec. 20, 1993 (FR) .................................... 93 15408

(51) Int. Cl.⁷ ............................ B29C 73/00; B29C 73/26
(52) U.S. Cl. ................. 156/97; 156/98; 156/153
(58) Field of Search .................... 156/95, 97, 96, 156/153, 98; 451/40, 36, 37, 38, 920, 61; 427/289; 157/13

(56) References Cited

U.S. PATENT DOCUMENTS

| | | | |
|---|---|---|---|
| 1,591,817 | * 7/1926 | Hawkinson | 156/97 |
| 2,430,076 | * 11/1947 | Pollock | 156/95 |
| 2,605,596 | * 8/1952 | Uhri | 451/40 |
| 3,085,924 | * 4/1963 | Nichols | 156/97 |
| 3,150,467 | * 9/1964 | Umbricht et al. | 451/40 |
| 3,212,378 | * 10/1965 | Rice | 451/40 |
| 4,044,507 | * 8/1977 | Cox et al. | 451/38 |
| 4,193,635 | 3/1980 | Thiruvengadam et al. . | |
| 4,237,209 | * 12/1980 | Oliver | 451/38 |
| 4,240,851 | 12/1980 | King . | |
| 4,626,300 | * 12/1986 | Barefoot | 156/96 |
| 4,917,708 | * 4/1990 | Yamaguchi et al. | 451/82 |
| 5,115,983 | * 5/1992 | Rutherford, Sr. | 241/1 |
| 5,222,332 | * 6/1993 | Mains, Jr. | 451/40 |
| 5,509,849 | * 4/1996 | Spears, Jr. | 451/40 |

FOREIGN PATENT DOCUMENTS

| | | | |
|---|---|---|---|
| 670954 | * 9/1963 | (CA) | 451/40 |
| 33 43 611 | 6/1985 | (DE) . | |
| 2 630 667 | 11/1989 | (FR) . | |
| 3-256698 | 11/1991 | (JP) . | |

OTHER PUBLICATIONS

J. Shields, Adhesives Handbook, pp. 235–237, 250–251, 256–257, 1970.*

Derwent abstract for SU 426,490, Dec. 1975.*

Database WPI, Week 9050, Derwent Publications Ltd., Lindon, GB AN 90–372423.

* cited by examiner

*Primary Examiner*—Geoffrey L. Knable
(74) *Attorney, Agent, or Firm*—Oblon, Spivak, McClelland, Maier & Neustadt, P.C.

(57) ABSTRACT

Process and device for treating vulcanized rubber surfaces before bonding by creating surface roughness and elimination of degraded surface particles through the use of a high pressure fluid jet.

7 Claims, 9 Drawing Sheets

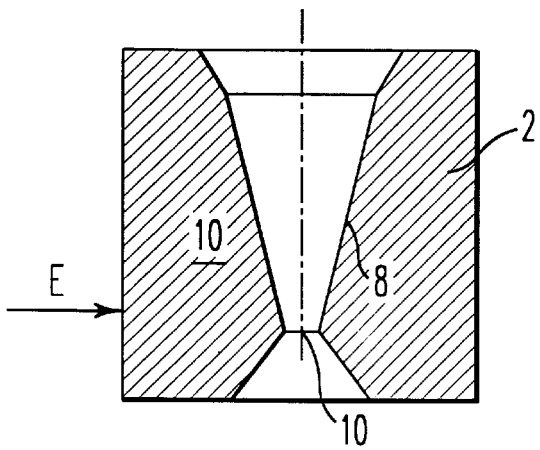
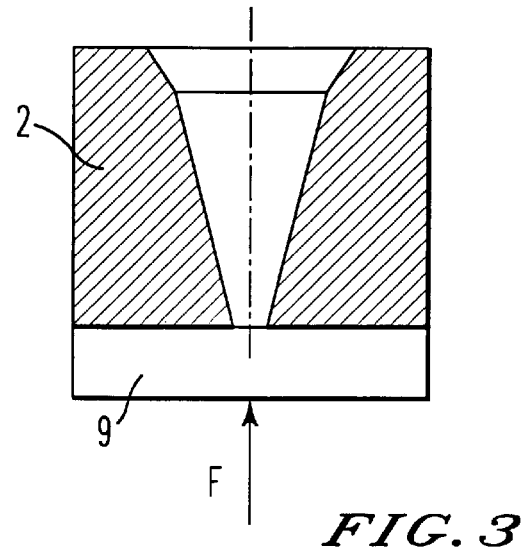
*FIG. 2*  *FIG. 3*
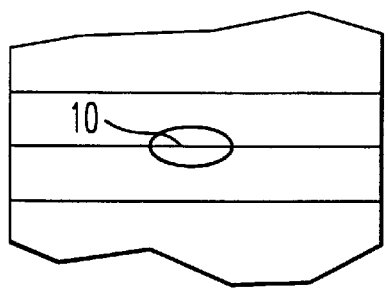
*FIG. 4*

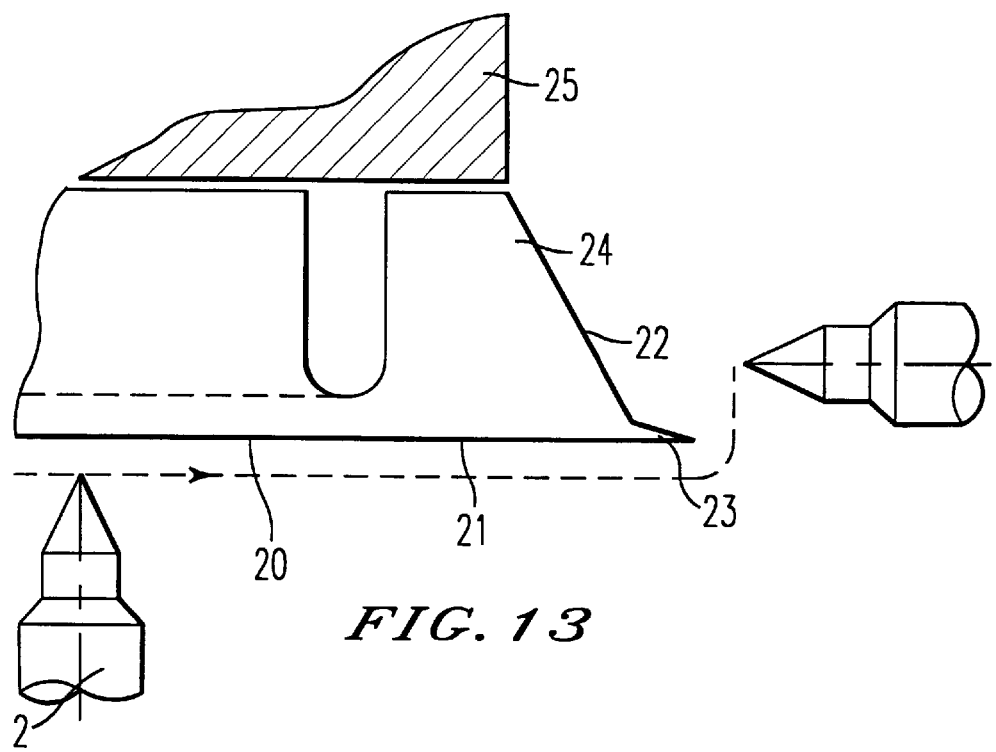
FIG. 13
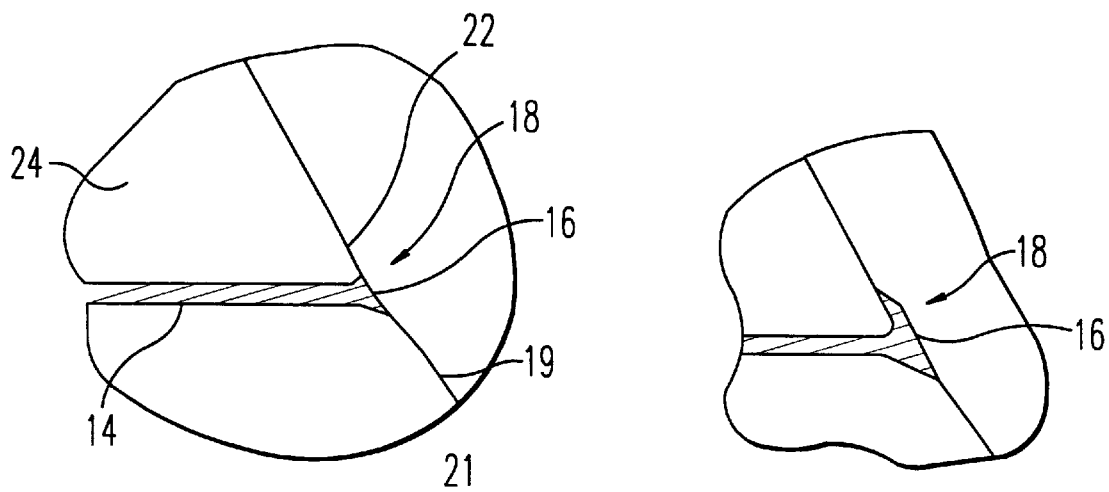
FIG. 14     FIG. 15

PROCESS AND DEVICE FOR TREATING VULCANIZED RUBBER SURFACES BEFORE BONDING

This is a Division of application Ser. No. 08/359,525 filed on Dec. 20, 1994, now U.S. Pat. No. 5,759,322.

FIELD OF THE INVENTION

The invention relates to the bonding of rubber materials and more particularly to the processes for treatment, before bonding, of the surfaces of vulcanized rubber materials that constitute tires.

DISCUSSION OF BACKGROUND

The retreading of a tire consists in separating it, i.e., removal by a machining operation of what remains of the worn tread, then mounting a new tread. The retreading requires that a mechanical bond be formed between the materials of the crown of the tire and the new tread, whether or not it is prevulcanized.

Usually this mechanical bond is created by inserting a nonvulcanized cushion gum between the crown and the new tread.

Consequently, when retreading is done with a prevulcanized tread, it is necessary to obtain an excellent bond between, on the one hand, the (nonvulcanized) cushion gum and, on the other hand, the materials of the crown and the new (vulcanized) tread.

Likewise, when a tire is being repaired, an excellent bond must be obtained between the materials of the damaged areas, after their degraded parts are removed, and a nonvulcanized repair material that may or may not be accompanied by a reinforcing part or vulcanized "patch." To obtain good bonding, it is necessary, in particular, that the surfaces of the vulcanized materials be clean, that their oxidized or degraded surface parts be removed, that they have a suitable roughness, and that contact with the nonvulcanized material be made under good conditions with, in particular, sufficient application pressure.

In the case of retreading tires, the machining intended to remove what remains of the worn tread can be performed in several ways. A first method consists in using a "buffing machine." Such a machine uses a rotary abrasive tool including a set of metal disks having abrasive teeth on their outside circumferences. These disks are assembled perpendicular to a common axis of rotation. The buffing makes it possible to remove what remains of the worn tread and thus to bring the crown of the casing to the desired geometric shape while imparting to the rubber surface a roughness that is suitable for the subsequent bonding. An example of suitable roughness is provided by the reference plates provided for retreading and repairing tires by the Rubber Manufacturers Association. This machining by buffing which is simple and effective, is the process currently used.

However, it has several drawbacks: (1) a great deal of damaging heating of the rubber surface is caused; (2) a great deal of rubber debris is produced which needs to be vacuumed off; and (3) difficult work conditions are created because of the pollution due to the noise and the rubber crumb.

Another method consists in removing what remains of the worn tread with either hot or cold blades. However, after this machining, the rubber surfaces obtained are smooth; this necessitates a subsequent brushing operation to create the surface roughness that experiments have shown to be necessary for good bonding reliability.

A critical area of the mechanical bond between the crown of the tire and the new tread is the area located at the two lateral edges of the new tread. Depending on the geometry of the tread used (i.e. flat tread, flared tread, curved tread . . . ,), the lateral edges or flarings or "flanges" are connected to the edges of the crown or to the shoulders of the tire. This area is heavily stressed mechanically during driving, and it has been found that any bonding failure causes cracks to appear, and then to spread. These cracks can then spread along the interfaces between the cushion gum and the crown or the tread, and may also penetrate directly into the materials of the crown or the shoulders.

SUMMARY OF THE INVENTION

Accordingly one object of this invention is to provide a novel method and device for treating vulcanized rubber surfaces before bonding which makes it possible to clean the surfaces and to create a roughness that is suitable for an excellent bond without it being necessary to perform a brushing operation.

The application of this treatment method to retreading tires, repairing tires, producing prevulcanized treads as well as producing new tires, constitutes another object of the invention.

In the case of retreading, a particular object of the invention is to achieve an excellent bond in the area located between the two lateral edges of the new tread and the crown or the shoulders.

Tire "casing" is defined to mean either a used tire whose used tread remnants have been removed by a machining operation, or a vulcanized new tire that lacks only the tread.

The process for treating vulcanized rubber surfaces before bonding, according to the invention, comprises a step for creating surface roughness and for eliminating degraded surface particles by applying a high-pressure fluid jet.

This process for treating rubber surfaces before bonding has the advantage of providing clean surfaces that are free of fouling and have a fine and even roughness suitable for a bond of excellent quality.

Many operating conditions for applying a high-pressure fluid jet make it possible to create surface roughness according to the invention.

According to a preferred embodiment, use is made of a fluid jet, a section of which, perpendicular to the direction of application of said fluid jet, has an approximately elliptical shape with a ratio between the major axis of the ellipse and the minor axis of the ellipse which is greater than 6.

This "flat" fluid jet is preferably applied in such a way that the direction of the relative displacement of fluid jet in relation to said rubber surfaces is perpendicular to the major axis of said ellipse of the section of the fluid jet.

The use of such a flat fluid jet, with such an orientation in relation to the direction of the relative displacement of the treated rubber surfaces, makes it possible to treat a strip of said rubber surface at any time without this treatment affecting anything other than the surface area of said rubber surface.

Depending on the nature of the treated vulcanized rubber material, the feed pressure of the fluid is between 100 and 250 MPa. To prevent the application of a fluid jet with such pressures from causing cuts in the treated rubber surfaces, it is very important to have a high speed of relative displacement between the fluid jet and the treated surfaces; a speed of between 50 and 300 m/min is suitable.

According to another characteristic, the high-pressure fluid is sprayed on the vulcanized rubber surfaces at a distance between 8 and 20 mm.

It is a further advantage of the present invention that water can be used as the fluid applied under pressure.

The invention also has as its object a device for putting into practice the preceding process for treating vulcanized rubber surfaces before bonding. This device, using a pressurized fluid, comprises a feed pipe for said pressurized fluid, with the pipe ending in a nozzle, and includes apparatus for support and for relative displacement of vulcanized rubber surfaces in relation to the nozzle. The nozzle has an outlet orifice for the fluid which orifice is obtained by the intersection of a cone and a dihedron, with the axis of the cone being perpendicular to the straight line of intersection of the two planes of the dihedron.

According to another characteristic, an extension of the outlet orifice, along a plane perpendicular to the axis of said cone, has a elliptical shape with a ratio between the major axis of the ellipse and the minor axis of the ellipse on the order of 1.4.

Advantageously, the angle of the apex of the cone is between 25 and 35° and the angle of the dihedron is between 65 and 70°.

According to a preferred embodiment, the length of the major axis of said ellipse of said plane extension of said outlet orifice of the nozzle is between 0.30 and 0.40 mm.

The invention also has as its object a first application of the process to the retreading of tires. This tire retreading process is characterized in that, after the remaining portion of the worn tread is removed by machining with and before a new tread is applied, the surfaces of the crown and of the shoulders of said tire are prepared by application of a high-pressure fluid jet.

This process is particularly indicated when the machining of the crown of the tire to be retreaded is performed with a separating blade. The practically smooth surface obtained from the machining can then be subjected to a high-pressure fluid jet without it being necessary to use a machining device such as a buffing machine or a brush.

The roughness of a rubber surface can be characterized with the aid of a laser profilometer. This device measures, in particular, the $R_a$ parameter: arithmetic average of all the values of the roughness profile over a given evaluation length $1_m$. (DIN 4768).

The application to retreading of the process for treating vulcanized rubber surfaces before bonding, according to the invention, is further characterized in that, after having been treated, the roughness $R_a$ of the surface of the crown of the casing is greater than or equal to 10 micrometers.

The process of the invention can also be applied to the repairing of tires. The resulting process of repairing tires is characterized in that, after the degraded materials are removed from a damaged area of the tire, and before an additional material or a repair patch is applied on said damaged area, said area is treated by the application of a high-pressure fluid jet.

The invention also has as its object a process for producing a prevulcanized tread characterized in that, at the outlet of the vulcanizing mold, the surface of the sole of the tread is subjected to a high-pressure fluid jet.

This process for producing a prevulcanized tread can easily and advantageously include the inside and outside lateral edges of the tread.

This has the advantage of treating all the surfaces which can come into contact with the cushion gum, particularly when the cushion gum projects over the outside lateral edges of said tread during the subsequent curing phase of the casing and tread assembly.

If the process for producing said tread gives rise to the existence of molding burrs on at least one of its lateral edges, the process according to the invention can include a phase for cutting off burrs with a high-pressure fluid jet.

Consequently, these burrs are no longer be points where cracks start, and the reliability of the mechanical bond between the casing and the tread is greatly strengthened.

Finally, the process according to the invention can also advantageously be applied to the production of new tires. According to this process, after a prevulcanized tire casing as well as a prevulcanized tread are produced and before they are assembled using known means, the surfaces of the crown and the shoulders of said casing are treated with a high-pressure fluid jet.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is an axial section of a nozzle for applying a high-pressure fluid jet;

FIG. 3 shows an axial section of a nozzle for applying a high-pressure fluid jet, viewed according to E as indicated in FIG. 2;

FIG. 4 is view of the outlet orifice of the fluid outside the nozzle, viewed according to direction F indicated in FIG. 3;

FIG. 13 depicts the process for treatment of an edge of the sole of the flat tread;

FIG. 14 shows a cross-section of the lateral edge of the mechanical bond obtained between a flat tread and the crown and shoulder of a casing after curing;

FIG. 15 is a variant of FIG. 14 in the case where the outside end of the tread is covered by the cushion gum;

DETAILED DESCRIPTION OF THE PREFERRED EMBODIMENTS

Figure 1:
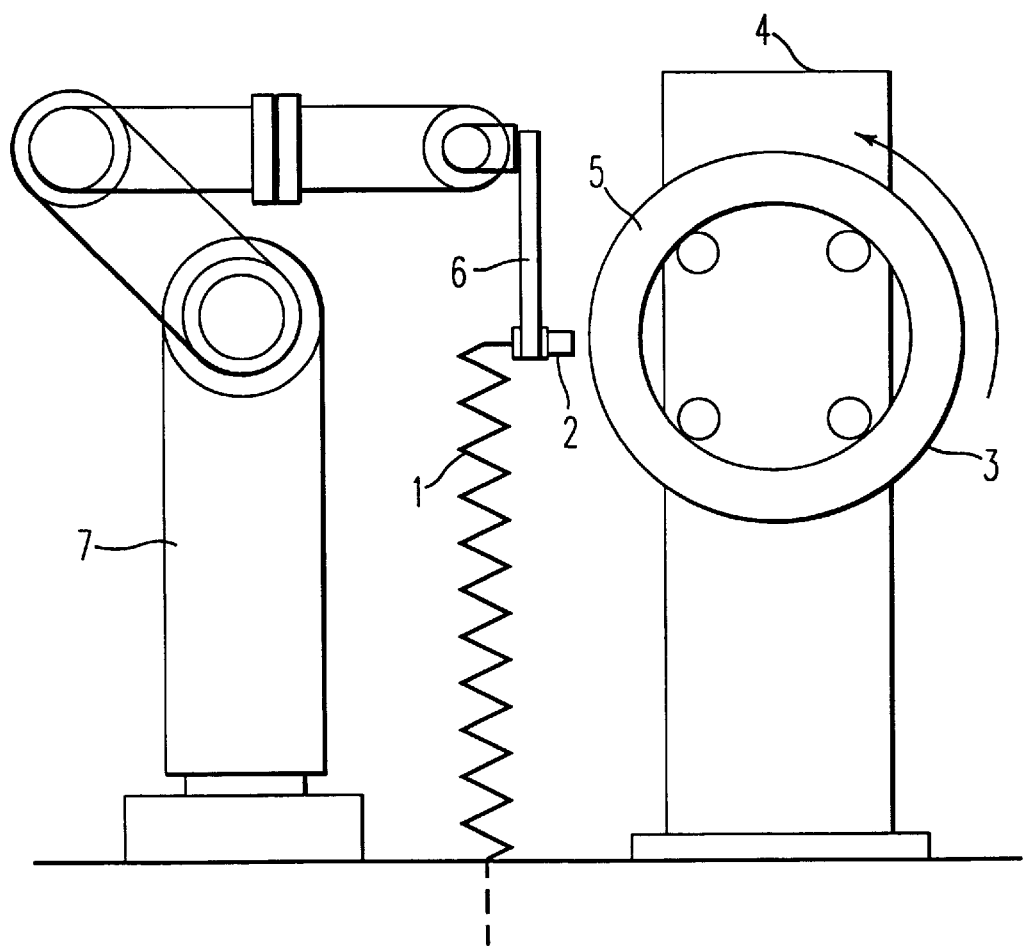
FIG. 1 is a schematic diagram of a device for putting into practice the process according to the invention for the treatment of a tire casing.

Referring now to the drawings, wherein like reference numerals designate identical or corresponding parts throughout the several views, a device for putting into practice the process of the invention for the treatment of a tire casing is provided in FIG. 1.

This device comprises a pump (not shown) for pressurizing and feeding (Jet-Edge No. 36-100) of fluid (water) under pressure, a feed pipe 1 which ends in a nozzle 2.

Tire casing 3 is mounted on frame 4. The casing is driven in rotation by the four rotating cylindrical supports 5. In all cases, casing 3 has been placed in rotation before any fluid jet under pressure begins to be applied and has been stopped only after said application of the fluid jet under pressure has ceased.

Nozzle 2 is fastened to arm 6 of a robot 7 which allows displacement at an imposed linear speed and along determined paths relative to the inside and outside surfaces of tire casing 3.

The Utilized Fluid is Water

This device is characterized by great flexibility of use: the characteristics of the water jet (feed pressure, flow rate) as well as the conditions of its application (distance, relative paths, and speeds of displacement) can be adjusted.

The geometry of outlet orifice 10 of the water under pressure to the outside of nozzle 2 is the result of the intersection between a cone 8 and a dihedron 9. The axis of cone 8 is perpendicular to the straight line of intersection of the two planes of dihedron 9 (FIGS. 2 to 4).

The angle at the apex of cone 8 is, preferably, between 25 and 35° and the angle of dihedron 9 is preferably between 65 and 70°.

A plane projection, along the axis of cone 8, of outlet orifice 10 has an elliptical shape with a ratio between the major axis of the ellipse and the minor axis of the ellipse on the order of 1.4. The length of the major axis of this ellipse is between 0.30 and 0.40 mm. Nozzle 2 is made of, e.g., steel.

The advantage of this geometry is that a "flat" water jet is obtained, i.e., a perpendicular section of the water jet, at a distance of about 12 mm from nozzle 2, which exhibits an approximately elliptical shape with a major axis on the order of 10 mm and a minor axis on the order of 1.5 mm. The "useful" width of the water jet, i.e., the area where the application pressure of the water is maximum, is about 3 to 4 mm.

During application to a rubber surface, the major axis of the ellipse, which is parallel to the straight line of intersection of the two planes of dihedron 9, is perpendicular to the direction of the displacement of the treated rubber surface relative to the water jet. This makes it possible to increase appreciably,.at any time, the rubber surface treated by the water jet at a given relative displacement speed between the water jet and the rubber surface.

Many operating conditions make it possible to conduct the treatment of vulcanized rubber surfaces, before bonding, according to the invention. The following conditions, however, are particularly suitable with a nozzle 2 such as the one previously described and have been used for the tests described below:

feed pressure of the water: variable from 150 to 250 MPa;
distance between nozzle 2 and the surfaces to be treated: 12 mm;
speed of advance of the vulcanized rubber surfaces: 100 m/min;
displacement speed of the nozzle: 1 mm/sec (this speed is normal to the speed of advance of the vulcanized rubber surfaces).

The roughness of the rubber surfaces, before and after treatment according to the invention, was characterized by parameters $R_a$, $R_{max}$, S, which were obtained by means of a laser profilometer with an evaluation length of 48 mm.

$R_a$: average roughness according to DIN 4768, an arithmetic average of all the values of the roughness profile over the evaluation length $l_m$=48 mm;

$R_{max}$: maximum roughness over the total evaluation length $l_m$=48 mm;

S: number of peaks, number of elevations of the profile which exceed a determined cutoff line, here located at 20 micrometers on both sides of the average line of the roughness profile.

To appreciate the nature of the roughness of the surfaces obtained, one of the surfaces proposed as references by the Rubber Manufacturers Association has also been characterized; these surfaces are called "RMA plates" below.

Figure 5:
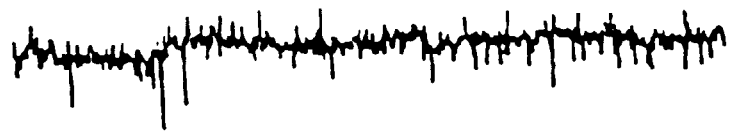
FIG. 5 presents a roughness profile of a tread sample produced by smooth-mold curing and before treatment according to the invention.
Figure 6:
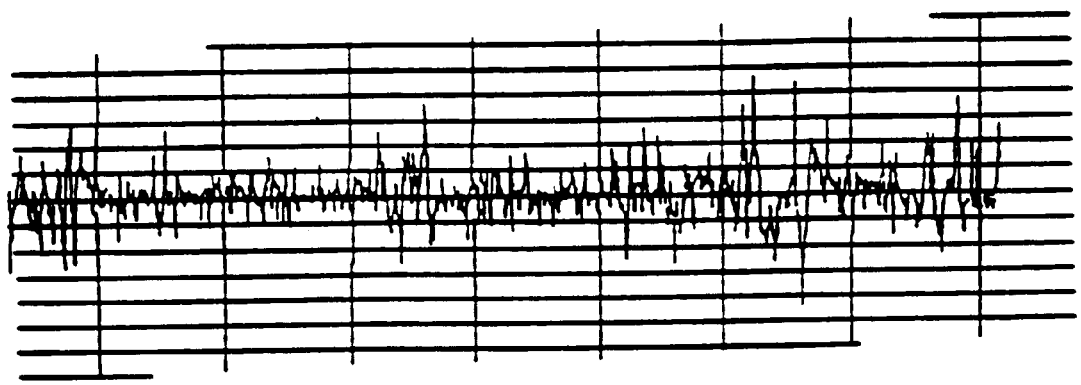
FIG. 6 is a roughness profile, with an ordinate scale four times smaller, of a sample similar to the preceding one after the treatment before bonding.
Figure 7:
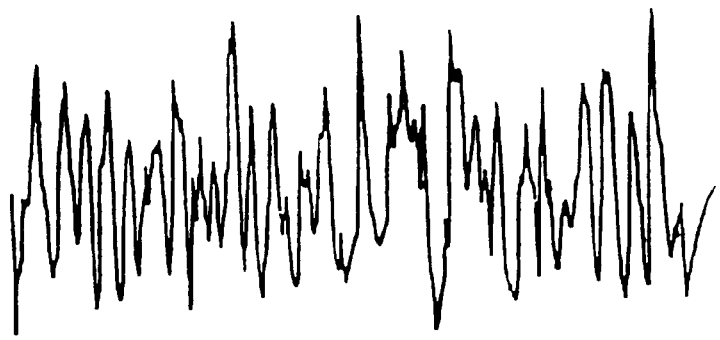
FIG. 7 is a roughness profile, on the same scale as FIG. 6, of a reference sample of the Rubber Manufacturers Association, that of RMA 3.

FIGS. 5 to 7 depict roughness profiles measured on the following samples:

sample 1: surface of a stock sample for a tread before treatment according to the invention, obtained directly from a smooth mold curing (FIG. 5) (scales: abscissas 1 mm for 500 μm, ordinates 1 mm for 2.5 μm);

sample 2: surface of the same stock sample for a tread after treatment according to the invention with a water feed pressure of 200 MPa (FIG. 6) (scales: abscissas 1 mm for 500 μm ordinates 1 mm for 10 μm);

sample 3: surface of an RMA 3 label, this surface has a roughness obtained by roughening recommended for retreading (FIG. 7) (scales: abscissas 1 mm for 500 μm ordinates 1 mm for 10 μm).

The following table exhibits the roughness characterization results of the samples.

Table 1: Characterization of the Roughness of the Surfaces of the Samples of Stocks

|  | Sample 1 | Sample 2 | Sample 3 |
|---|---|---|---|
| $R_a$ (μm) | 2.0 | 13.9 | 63.8 |
| $R_{max}$ (μm) | 33.7 | 168.9 | 363.8 |
| S (±20 μm) | 1 | 89 | 36 |

These measurements indicate that, starting from a practically smooth surface, the treatment of surfaces according to the invention makes it possible to reach an $R_a$ level of 13.9 μm. Compared with the sample of RMA 3, smaller values of $R_a$ and $R_{max}$ are found, while having many more peaks S. This indicates that the roughness obtained by the treatment according to the invention imparts a finer and more even roughness than buffing. This is confirmed by the roughness profiles presented in FIGS. 6 and 7.

Furthermore, the maximum roughness obtained indicates that the effect of the treatment is limited, in depth, to the first tenths of a millimeter of the treated rubber surfaces.

The standard bonding tests performed in a laboratory, i.e., under optimum performance conditions, with treated or brushed or buffed samples, have confirmed the quality of the bonding obtained with the treatment according to the invention.

The process for treating vulcanized surfaces according to the invention applies particularly to the retreading and repair of tires.

Figure 8:
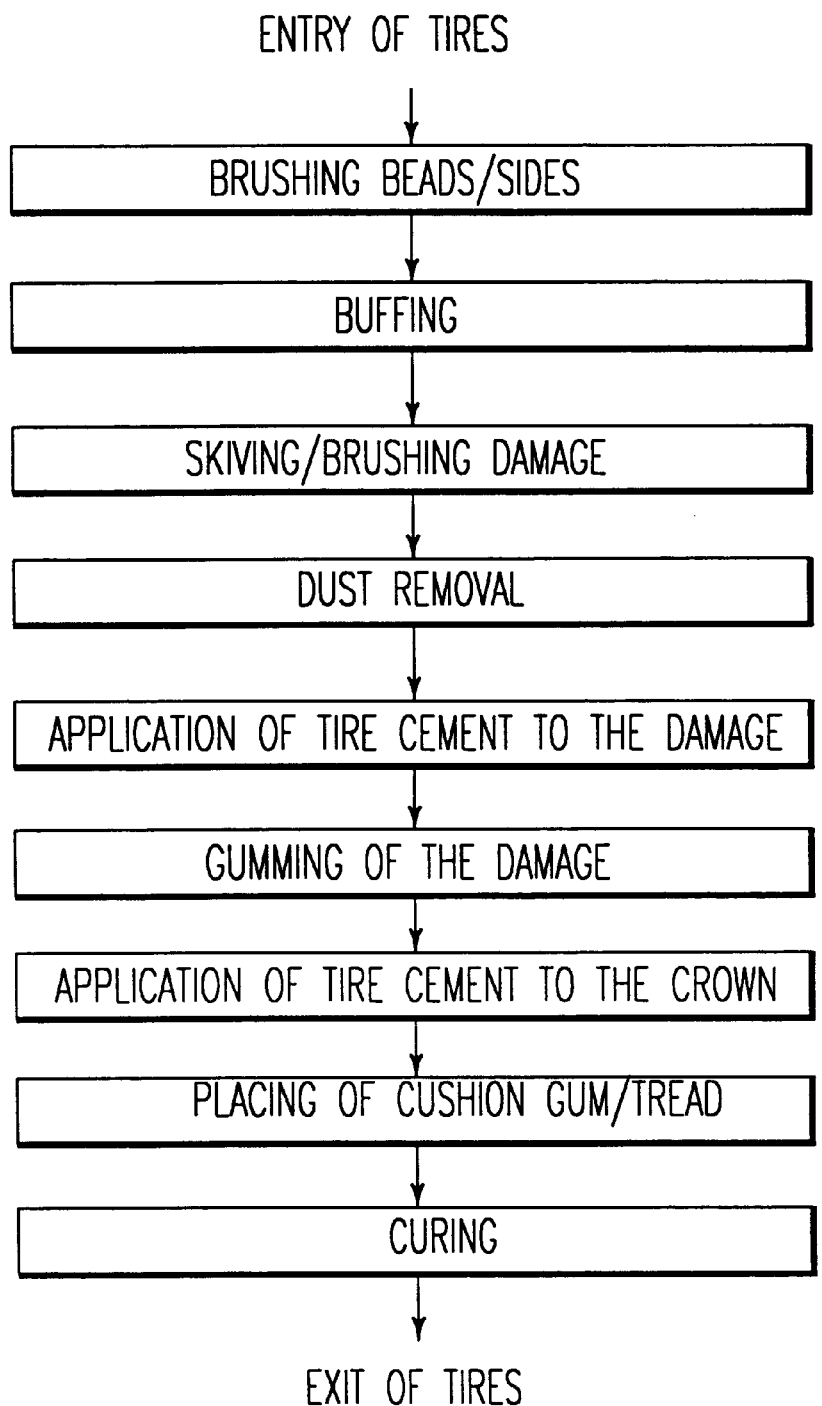
FIG. 8 indicates the steps of the standard retreading process.

FIG. 8 indicates the sequence of the operations traditionally followed during the retreading of a tire. After beads 12 and sides 11 of the worn tires are brushed to clean them, separation is performed, i.e., the removal of the remnants of worn tread 15 by means of a buffing machine. Then, casings 3 are inspected and the damage "skived," i.e., brushed with a hard brush or a small buffing device to remove all the damaged materials. The skiving is following by a brushing with a soft brush to eliminate the parts of the materials burned by the hard brush and to clean the cavities of all debris and dust. After additional dust removal, a tire cement is applied to the damaged areas to facilitate the subsequent bonding of the surfaces. This solution is allowed to dry, and then a repair material or patches are applied to these same surfaces: the "gumming" of the damage. In turn, crown 14 then receives tire cement. After the tire cement dries, a cushion gum 16 and the new tread 15, prevulcanized or not, is placed on the surface of crown 14. Finally, cushion gum 16, the repair materials, and new tread 15 are vulcanized, if necessary.

Figure 9:
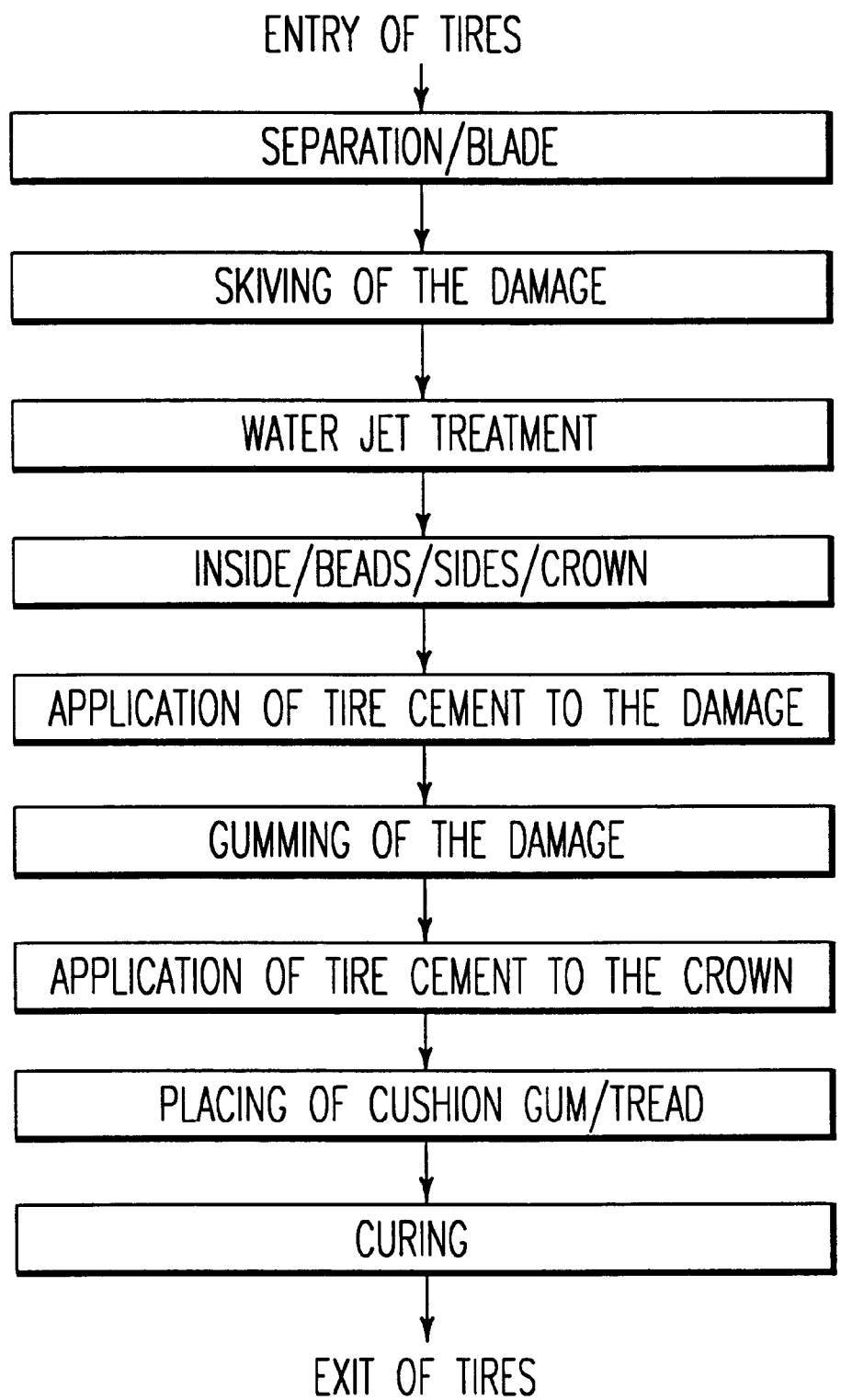
FIG. 9 presents the steps of the retreading process with application of the surface treatment process according to the invention.

FIG. 9 indicates retreading and repair operations using the surface treatment according to the invention. The tires are directly separated with a separating blade. The damage is then skived using a small cutting rotary tool with a cylindrical blade. This tool makes it possible to remove all the damaged parts and leaves the surfaces approximately smooth. The group of interior 13 and exterior 11, 12, 14 surfaces of tire casing 3 is then treated by the application of a high-pressure jet of water using the device depicted in FIG. 1 and under the conditions previously described. Sides 11, beads 12, and interior 13 are treated by a jet of water applied with a feed pressure on the order of 150 MPa.

Finally, the surfaces of crown 14 and shoulders 19 are treated with an application pressure on the order of 200 MPa. After drying in, e.g., a drying oven, a tire cement is put on all the surfaces of the damage. After this tire cement dries, repair material or patches are applied to the damaged areas. The tire cement of crown 14, the placing of cushion gum 16 and of tread 15 on crown 14 of casing 3, and the vulcanization of cushion gum 16, of the repair materials, and of new tread 15, if necessary, are finally performed as before.

The treatment according to the invention thus has the advantage of making it possible to use cold cutting tools such as separating blades during the separation, or tools having a rotary cylindrical blade, during the skiving of the damage, without it being necessary later to perform a buffing or brushing operation. This avoids the installation of devices for vacuuming up and removing the rubber crumb. Another important advantage is that this treatment can be applied to all of the surfaces to be treated, regardless of their geometries. The work conditions in the shop are also very greatly improved.

The conditions of the surface treatment of the sides and of the inside of the tire are less demanding than in the case of the crown and shoulders. Actually, this treatment does not require that as distinct a surface roughness be obtained. It must provide a surface condition that is suitable for the optional subsequent bonding of repair material or patches.

Of course, the surface treatment, according to the invention, is also very effective in the case of buffed crown surfaces. In this case, it makes it possible to eliminate the surface particles that are degraded, particularly by heating. It also ensures treatment of the entire surface of the crown, for example areas which can be smoothed because of a manual repatterning of the profiles. Finally, it makes it possible to even out the surface roughness.

In addition, the number of repair operations and the time necessary for each of them are considerably reduced.

The treatment according to the invention can also be applied to the production of premolded and prevulcanized treads 15 for retreading.

Two processes are currently used to create a clean surface condition for good subsequent bonding on a tire crown 14 (FIG. 10);
  after vulcanization of tread 15, sole 20 of said tread 15 is brushed, then a tire cement is applied, and a strip of polyethylene is applied as protection;
  before curing, a polyester fabric is placed under sole 20 of tread 15, which will be bonded tightly to sole 20 during vulcanization. This polyester fabric will protect sole 20 before it is applied to crown 14 of the tire. Just before this application, said sheet is torn away, which creates a surface roughness that is suitable for bonding.

The application of the treatment according to the invention to the production of premolded and prevulcanized treads consists in substituting for the brushing operation after curing the application of a high-pressure jet of water to create the surface roughness suitable for subsequent bonding on crown 14 of a tire casing. This process also advantageously replaces the costly application of the polyester fabric on sole 20 of tread 15 before curing.

This process is applicable to all types of tread, particularly "flat treads" 24 (FIG. 11) and ring treads 29.

Figure 11:
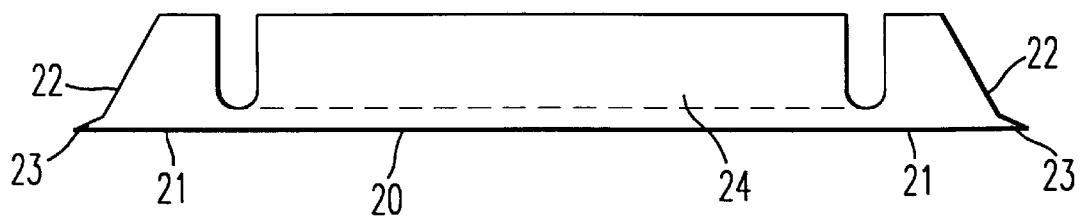
FIG. 11 depicts a section of a premolded and prevulcanized tread for the retreading of a casing, known as "flat tread;"
Figure 12:
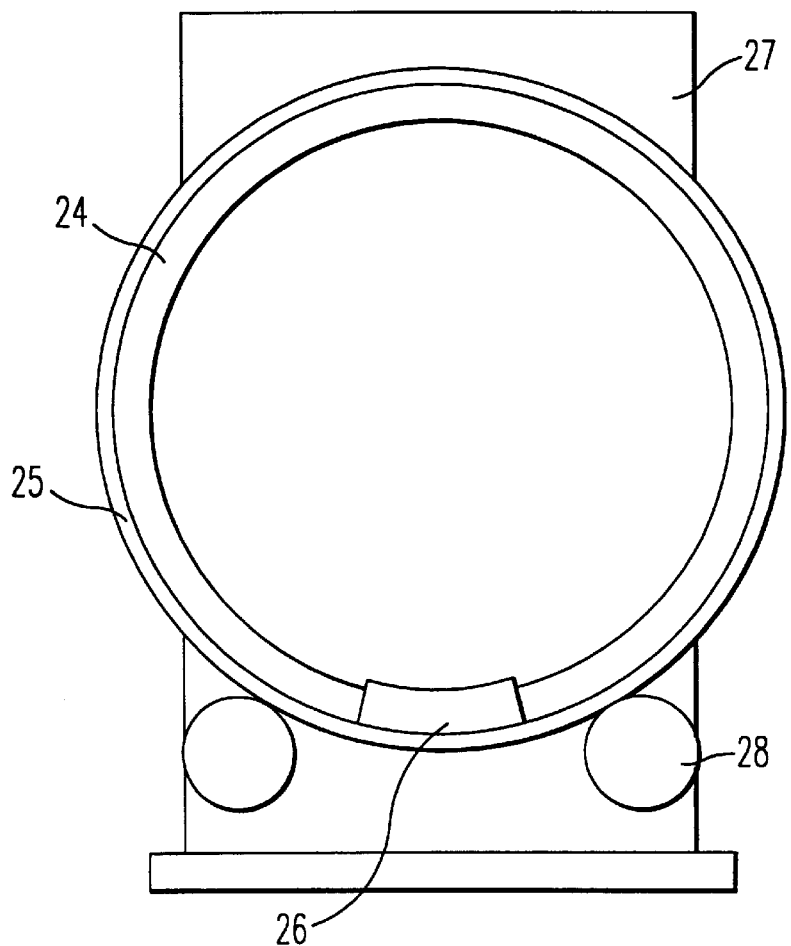
FIG. 12 shows a device for holding a flat tread, to be treated according to the invention.

A device to perform this treatment of a prevulcanized tread, for example, a "flat tread" 24, is depicted in FIG. 12. Flat tread 24 (FIG. 11) is rolled against the inside surface of a cylindrical sleeve 25 mounted on a frame 27. The profiles of flat tread 24 are placed against said sleeve 25.

Flat tread 24 is locked by a dog 26. Cylindrical sleeve 25 and flat tread 24 are placed in rotation by rotary supports 28, and then the treatment is performed by the device shown in FIG. 1.

This process for producing a prevulcanized tread 14, 24, 29 can easily and advantageously include inside 21 and outside 22 lateral edges of tread 14, 24, 29 which is much more difficult to perform during a brushing operation. By inside lateral edges 21 are meant the lateral ends of sole 20 of the tread, and by outside lateral edges 22 are meant the ends of the lateral faces of the tread that are adjacent to sole 20 of said tread 15, 24, 29.

Figure 10:
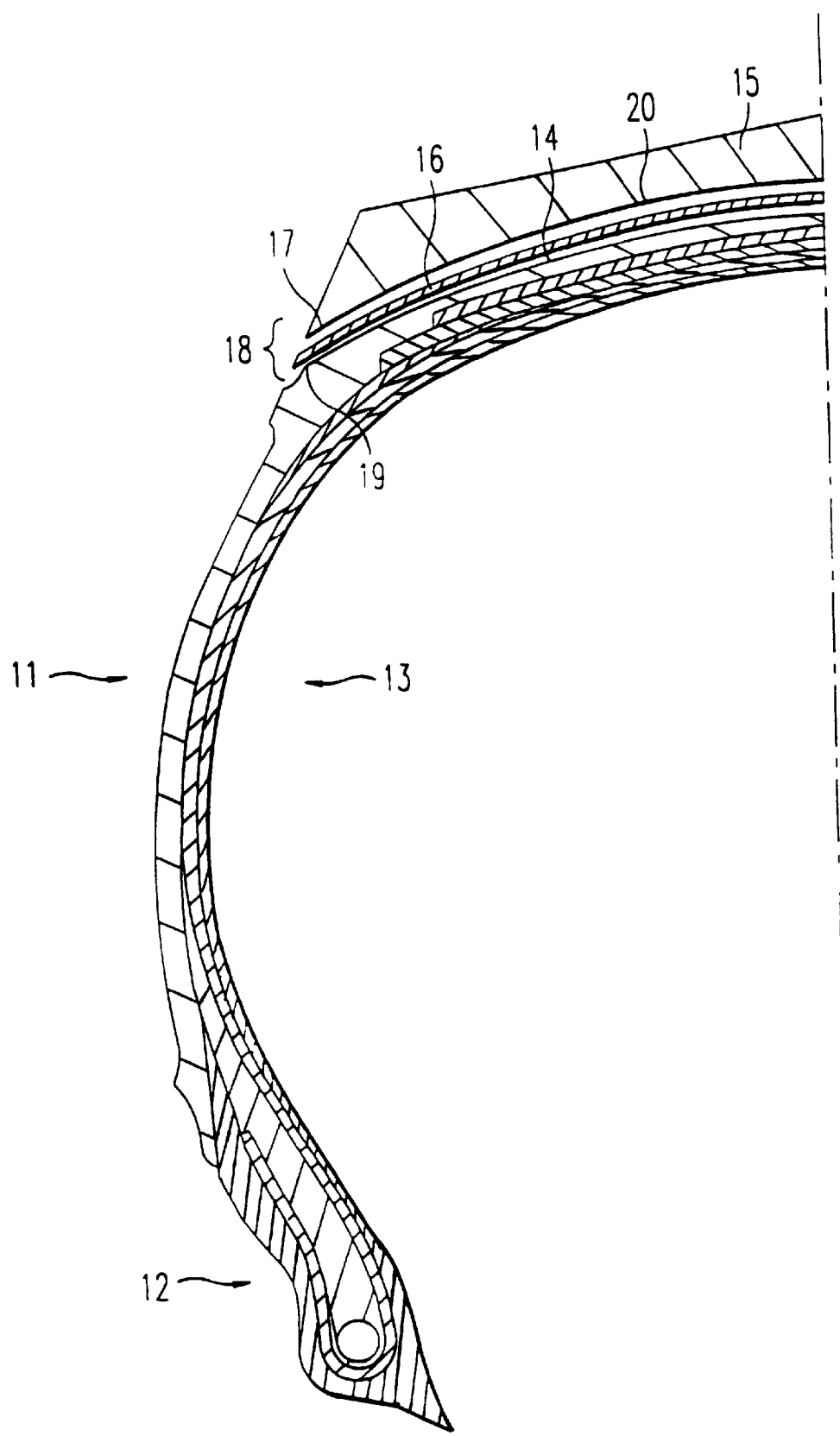
FIG. 10 is a partially exploded axial section of a tire.

This has the advantage of treating all the surfaces which can come in contact with cushion gum 16, particularly when cushion gum 16 projects over the lateral edges 21, 22 of tread 15, 24, 29 during the subsequent curing phase of casing 3 and tread assembly (FIG. 15). A prime cause of separation in critical area 18 at the two lateral edges of tread 15, 24, 29 is thus eliminated (FIG. 10).

A second cause of separation in this critical area 18 is the presence of molding burrs at the two lateral edges of tread 15, 24, 29. Actually, during the molding of the treads, excess stock is able to flow over the lateral edges and thus constitute burrs. These burrs are fine tabs several tenths of a millimeter thick which must be removed after curing, for example by a cutting with a blade.

When this cutting is poorly performed or is incomplete, the remaining parts of these burrs quickly become the starting points for separation.

The process of preparing for the bonding of sole 20 of tread 15, 24, 29 can advantageously comprise a phase of cutting away these burrs 23 by means of a jet of water under pressure.

FIG. 11 depicts a tread known as a flat tread 24. In this case, burrs 23 are located at the two lateral edges of tread 24. To cut them off, it is enough, during the treatment of sole 20, to apply the water jet with more demanding conditions imposed on the ends of tread 24, by reducing the speed of advance, for example.

FIG. 13 indicates the path traveled by nozzle 2 during the treatment of the lateral end of a sole 20 of a flat tread 24 which comprises a molding burr 23. The application of the jet of water to molding burr 23, for example by reducing the displacement speed of the nozzle relative to the surface of said burr, suffices to cut off the burr very cleanly. The treatment includes, over several millimeters, the outside edge 22 of the flat tread for the reasons previously mentioned.

FIG. 14 depicts the geometry of the mechanical bond obtained after assembly of casing 3 and curing. Cushion gum 16 is in contact only with surfaces of vulcanized materials treated according to the invention, including when the cushion gum 16 rises against end 22 by creep during curing (FIG. 15).

Figure 16:
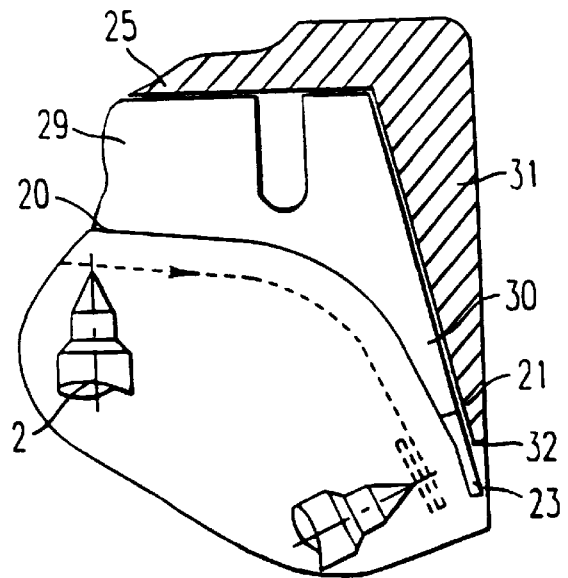
FIG. 16 depicts the process for treatment of an edge of the sole of a tread that is premolded and prevulcanized in a ring.

The treatment of a ring tread 29 comprising molding burrs 23 is depicted in FIG. 16. In this case, sleeve 25 has a shape suited to the outside geometry of ring tread 29. This sleeve 29 comprises a lateral stop 31 against which flanges 30 of ring tread 29 rest. In addition to treating the entire sole 20, nozzle 2, for example, makes several passes at molding burr 23, which pushes molding burr 23 against lateral stop 31 of sleeve 25. The pushing of burr 23 against sharp angle 32 of stop 31 is enough to cut off said burr 23 at this angle 32.

Figure 17:
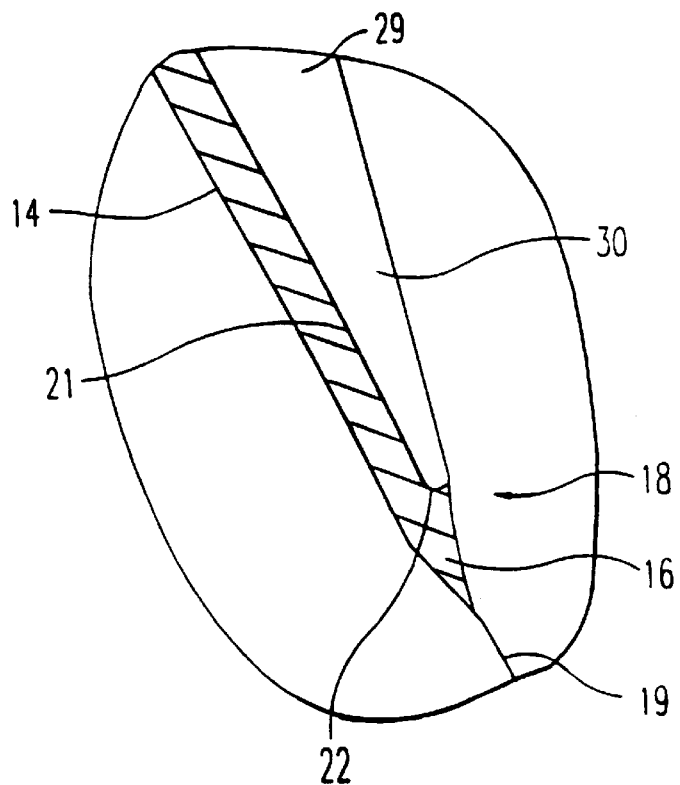
FIG. 17 is a section similar to FIG. 14 in the case of a ring tread.

FIG. 17 depicts the geometry of the mechanical bond obtained after curing in the case of such a ring tread 29 with flanges 30. Again, cushion gum 16 is in contact only with vulcanized rubber surfaces treated according to the invention and, consequently, the reliability of such a mechanical bond is excellent.

Tests have been performed to check the quality of the bond achieved after treatment according to the invention.

By way of example:

four new 315/80 R 22.5 XDA tires were separated with a separating blade, then the surfaces of their crowns were treated by application of a jet of water at high pressure, two with a feed pressure of 150 MPa and two at 230 MPa. The completion of the retreading procedures was then performed in the standard way.

The tests performed on the vehicle to check in particular the mechanical strength of critical areas 18 did not reveal any separation in these areas 18 for the four tires under consideration (FIG. 10).

Tires prepared as before, but with application pressures of 150, 200, 230 MPa, were also subjected to a hammering test of the crown which causes the creation of cracks and their rapid progression in areas of deficient quality of bonding between tread 15 and crown 14.

In all cases, the separation of the tires after the end of the test revealed no area of weaker bonding.

These two tests prove the quality of the bonding obtained after treatment according to the invention during the retreading of tires.

The case of a repair of the "inside rubber" of a tubeless tire, i.e., the layer of stock which is placed under the casing layer of the tire and ensures the airtightness of the tire by taking the place of the air chamber:

Four tires had the same area of said inside rubber repaired. Two were brushed to RMA 2, and two were treated with an application pressure of 150 MPa. At the end of one hour, a patch was placed on a brushed and treated tire, after application of a tire cement.

At the end of 64 hours, a patch was placed on the two remaining tires, after application of a tire cement.

The four patches were vulcanized in known way, and then the patches were torn away.

For the two tires that underwent brushing, separation occurred at the level of the bond between the inside rubber and the material of the patch. However, for the two tires treated according to the invention, the separation took place between the inside rubber and the calendering of the casing layer.

In conclusion, these tests show an improved quality of the bond between the patch and the inside rubber after treatment according to the invention compared with the traditional brushing.

Finally, this process can also be applied to the production of new tires. In this case, a prevulcanized tire casing 3 is produced in a smooth mold. A premolded and prevulcanized tread 15, 29, preferably ring-shaped, is also produced. Then crown 14 of casing 3 and/or sole 20 of tread 15, 29 is treated according to the invention. A cushion gum 16 is applied. Finally, standard assembly is performed, followed by vulcanization of cushion gum 16.

This process has the advantage of eliminating the problems connected with the molding of profiles during the curing of the tire, for example the uncertainty regarding the actual position of the reinforcing wires due to the lack of control of the rubber flows, while ensuring the production of tires of excellent quality.

Obviously, numerous (additional) modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for tire repair, comprising, in order, the steps of:

removing degraded materials from a damaged area of said tire to achieve a generally smooth surface at said damaged area;

applying a high-pressure jet consisting of water to a surface of said tire including said damaged area to achieve a desired surface roughness and remove any degraded surface particles resulting from said step of removing degraded materials in said damaged area;

drying said tire; and applying one of additional material and a repair patch to said damaged area.

2. Process according to claim 1, wherein a feed pressure of said water is between 100 and 250 MPa and a relative displacement speed between said high-pressure water jet and said surface including said damaged area is between 50 and 300 m/min.

3. Process according to claim 1, wherein said high-pressure water jet is sprayed on said surface including said area at a distance of between 8 and 20 mm.

4. Tire repair process according to claim 1, wherein sections of the high-pressure water jet, perpendicular to the direction of application of said water jet, have approximately elliptical shapes with a ratio between the major axis of the ellipse and the minor axis of the ellipse that is greater than 6, and the direction of a relative displacement of said water jet in relation to said surface including said area is perpendicular to the major axis of said ellipse of said section of the water jet.

5. The process according to claim 4, wherein said high-pressure water jet is discharged from a nozzle with an outlet orifice having an elliptical shape with a major axis having a length between 0.30 and 0.40 mm.

6. The process according to claim 1, wherein said high-pressure water jet is discharged from a nozzle with an outlet orifice having a shape obtained by the intersection of a cone and a dihedron.

7. The process according to claim 6, wherein an angle of an apex of said cone is between 25 and 35 degrees, and an angle of said dihedron is between 65 and 70 degrees.

\* \* \* \* \*

UNITED STATES PATENT AND TRADEMARK OFFICE
CERTIFICATE OF CORRECTION

PATENT NO.    : 6,302,984 B1  
DATED         : October 16, 2001  
INVENTOR(S)   : Courel et al.

Page 1 of 1

It is certified that error appears in the above-identified patent and that said Letters Patent is hereby corrected as shown below:

<u>Title page,</u>  
Item [73], Assignee information is incorrect and should read as follows:

-- [73]   Assignee:   Compagnie Generale des Etablissements Michelin - Michelin & Cie, Clermont - Ferrand (FR) --

Signed and Sealed this

Twenty-seventh Day of August, 2002

*Attest:*

*Attesting Officer*

JAMES E. ROGAN  
*Director of the United States Patent and Trademark Office*